United States Patent Office

Re. 24,011
Reissued May 31, 1955

24,011

METHOD FOR TREATING CELLULOSE AND PRODUCT THEREOF

Walter P. Ericks, Lockport, N. Y., assignor to The Upson Company, Lockport, N. Y., a corporation of New York No Drawing. Original No. 2,629,674, dated February 24, 1953, Serial No. 103,527, July 7, 1949. Application for reissue May 28, 1954, Serial No. 433,321

16 Claims. (Cl. 117—140)

Matter enclosed in heavy brackets [ ] appears in the original patent but forms no part of this reissue specification; matter printed in italics indicates the additions made by reissue.

This invention relates to dimensionally stabilized materials of cellulose fibers, particularly cellulose structural materials, and to methods for stabilizing such materials against dimensional change caused by change in the humidity of the environment surrounding such cellulose materials. More particularly, the invention relates to the stabilization of structural cellulose fiber boards as well as wood and paper and fabrics made of cotton, linen and other cellulose materials to render them more resistant to dimensional changes resulting from variations in the ambient humidity and to improve the strength of such products.

It is well known that materials made up entirely or predominantly of cellulose fibers expand and contract with variations in humidity in the ambient atmosphere, such materials suffering an increase in their dimension upon absorption of moisture from the atmosphere and a contraction when moisture is given up to the atmosphere upon a decrease in the humidity thereof. It is also well known that in articles wherein fibers are directionally oriented, such expansion and contraction usually occurs to the greatest extent in a direction perpendicular to the predominant direction of the fibers. The present invention is, therefore, adapted particularly in preventing or minimizing the dimensional change which occurs across the fibers with change in humidity in cellulose materials, although it also reduces dimensional change in the direction of the fibers with humidity change.

Various expedients have been heretofore employed for the purpose of dimensionally stabilizing materials made up predominantly of cellulose fibers as, for instance, plywood, wood boards, pulp products and combinations thereof, and solid paper boards. A degree of dimensional stabilization is obtained in the manufacture of plied or laminated articles by arranging the laminations with their fiber directions disposed angularly to one another rather than parallel. Although improvement in dimensional stabilization is obtained, the operation is laborious since it requires cutting and proper selection and assemblage of the plies.

It has also been suggested to densify the products under heavy pressure and to thereby set the cellulose fibers. Very expensive presses and extensive auxiliary equipment is required for this operation, and the product lacks low density and some of the flexibility desired for many uses of structural cellulose fiber board.

In my copending application Serial No. 627,966, filed November 10, 1945, and now abandoned, of which this is a continuation-in-part, as well as my copending application Serial No. 95,872, filed May 27, 1949, *now Reissue Patent No. 23,866*, I have disclosed that certain organic compounds having at least two hydroxyl groups in their molecules, particularly partial esters of polycarboxylic acids and polyhydric alcohols having at least one hydroxyl group in the residue derived from the polyhydric alcohol and at least one carboxyl group in the residue derived from the carboxylic acid, stabilizes structures made up predominantly of cellulose fibers against expansion and contraction due to variation in atmospheric humidity. I have disclosed in my copending application Serial No. 103,526, filed July 7, 1949, *now Patent No. 2,692,183*, that other compounds having both hydroxyl and carboxyl groups, such as hydroxy carboxylic acids, also are effective stabilizers against such expansion and contraction. In my copending application Serial No. 103,528, filed July 7, 1949, *now Patent No. 2,629,648*, I have also disclosed that polycarboxylic acids have a similar stabilizing effect.

In accordance with the present invention, I have found that materials made up predominantly of cellulose fibers may be wholly or partially stabilized against dimensional change by introducing into such cellulose materials certain specified chemical compounds which also appear to have a particular affinity for the cellulose fibers. Compounds which produce dimensional stabilization are organic in nature and have at least two hydroxyl groups and possess certain other characteristics with respect to volatility. The series of compounds possessing dimensional stabilizing characteristics are the polyhydric alcohols.

The polyhydric alcohols are usually either soluble in water or in low molecular weight aliphatic alcohols or ketones or mixtures of these solvents. When in solvent solution, they rapidly penetrate into the fibrous structures, between the fibers and into the fiber cells, and in fact many of them rapidly penetrate such fibrous structures even in the absence of a solvent. In most cases, however, greater dimensional stability is obtained when the polyhydric alcohols are employed in solution in a solvent for impregnating the fibrous structures. Further properties and characteristics of the stabilizing chemicals will be more fully described hereinafter.

For purposes of illustration only, the invention will be described in detail in its application to the production of dimensional stability in laminated structural cellulose fiber boards. Such products are best exemplified upon the market by the structural building panels sold under the name "Upson Board." These cellulose fiber boards are generally manufactured from so-called fiber boards, that is, a fiber sheet with a caliper greater than about 0.030 inch. These fiber boards are assembled and bonded to one another to produce a laminated or plied article having, for instance, from two to about seven plies. The resulting laminated structural cellulose fiber board occurs in standard sized panels of from ⅛ inch to ⅜ inch or more in thickness, and of specified lengths and widths. The original cellulose board is manufactured from any conventional type of cellulose pulp stock as, for instance, ground wood fiber, chemical wood fiber, rag fiber and other conventional pulp fibers and mixtures thereof. The initial cellulose board which constitutes the individual ply may be made either upon a conventional cylinder machine, as is generally the case, or may be made upon a Fourdrinier machine. It will be understood, however, that the invention is of general application to structural cellulose materials as, for instance, fiber insulation board, sound absorbing board, table top board, structural board for the interior of an airplane, and the like.

The compounds employed to effect stabilization in the structural cellulose fiber board against dimensional change induced by change in humidity may be introduced into the fibers from which the board is made, into the individual plies of the ultimate laminated structure or into the final laminated assembly itself. The choice of the place of introduction of the stabilizing compounds and the manner in which it is to be introduced will be dictated by the type of fiber available and the type of structural panel to be produced.

Thus, when operating a closed board machine system wherein all water is recycled, the impregnating compound may be added to the beater or to the stock prior to paper formation, as for instance in the head chest, assuming that a stabilizing compound has been chosen which is not readily subject to hydrolytic change at the temperature and pH of the pulp suspension. Or, the impregnating compound may be added at any other point in the wet end of the machine.

Where the individual cellulose structural board is already formed, the stabilizing compounds may be introduced into the board by immersing the board in a compound or a solution thereof or by impregnating the board with a spray containing the treating compound or by applying it with padding rolls, all conventional methods of impregnation. Where a laminated board has already been formed by bonding a plurality of individual boards together, the resultant laminated article may be immersed in the stabilizing compounds or a solution thereof and the impregnated board subsequently dried. The impregnation under such circumstances will generally be desirably performed by subjecting the board to vacuum, at which time occluded gases and volatile materials are removed from the board, then permitting the impregnating solution to flow into the evacuated chamber containing the board generally placed therein in an upright position and spaced apart, whereby the boards are enveloped in the solution which is, in effect, forced into the boards. This penetration of the solution may then be increased by relieving the vacuum and, if desired, raising the pressure above that of the atmosphere to enhance the speed and depth of penetration.

It is therefore an object of the present invention to provide a simple and inexpensive impregnating method for dimensionally stabilizing and strengthening structures made up substantially of cellulose and to produce dimensionally stabilized cellulose products.

In broad aspect, therefore, the invention comprehends the incorporation into structural cellulose fibrous materials of a polyhydric alcohol or mixture of such alcohols whereby the usual expansion and contraction of such cellulose materials is considerably minimized by reason of change in humidity conditions in the atmosphere surrounding such materials. This stabilizing effect is dependent upon the quantity of the stabilizing compound incorporated in the fibrous cellulose structural element. Effective dimensional stabilization has been accomplished by incorporating in the fibrous material from about 2 to 50% of the stabilizing compound based upon the weight of oven dried fiber. The exact quantity to be incorporated into the cellulose material will be dictated by the type of material, the type of polyhydric alcohol employed as a stabilizing compound, and the amount of the usual expansion or contraction which it is desired to remove. Thus, under certain conditions of use, the removal of so little as 12 or 15% of the normal expansion or contraction of a cellulose structural material may be suitable, while in other conditions of use, it may be desired to remove 50, 60 or 70% or more of the normal expansion or contraction encountered with a particular change in humidity conditions in the surrounding atmosphere.

The stabilizing compound may be incorporated into the cellulose fibers, whether the same be in fibrous form, unfibrated or felted fibrous form, by the employment of aqueous solutions, solutions in hydrophilic solvents, or mixtures thereof with water or in some instances may be incorporated without the employment of a solvent. However, the usual mode of incorporation will be to employ as an impregnating solution an aqueous or hydrophilic solution of the stabilizing compound.

The cellulose structural materials may be treated with the impregnated stabilizing material or solution thereof at substantially any desired temperature, although the usual impregnating temperatures will range between 20° C. and 50° C. However, temperatures as high as 100° C. may frequently be employed.

While the actual mechanism of the stabilizing action of the present invention for cellulose fibers is not fully understood, it is believed that their penetrating power and their fixation on and in the cellulose fibers is due to the particular molecular structure, that is to say, the presence of hydroxyl groups in both the cellulose and the stabilizing material.

After their incorporation in the cellulose material to be dimensionally stabilized, the stabilizing compounds show considerable resistance to removal by water and solvents, and it is believed, therefore, that probably there is some loose form of physico-chemical combination between the cellulose molecule and the stabilizing chemical. This resistance to removal of the stabilizers by water and solvents is quite marked, particularly if the impregnated cellulose products are heated to elevated temperatures as, for instance, between 100° C. and 200° C. It is further believed that the fixation of the stabilizing materials in and on the cellulose fiber may be due to the ability of the molecules of the stabilizing materials to react with each other, as well as with the cellulose, whereby polymerization takes place with the formation of long chain molecules of high molecular weight. The presence of hydroxyl groups in the polyhydric alcohol suggests that, on heating, the hydroxyl groups of the polyhydric alcohol react with the hydroxyl groups of the cellulose to modify the chemical structure of the latter. It is believed that such modification of the cellulose results in increased dimensional stability of the cellulose structural material and also increases its strength and water resistance.

The fixation of the stabilizing compounds in and on the cellulose fibers can be enhanced by employing them in combination with thermosetting resins, which in their partially reacted state are soluble in the volatile, hydrophilic solvents for the stabilizers such as water, low molecular weight alcohols and ketones or mixtures thereof. The thermosetting resins, after setting, are believed to cover and protect the stabilizing materials in and on the cellulose fibers from attack by solvents. In this connection, it is further believed that the stabilizing materials penetrate farther into the cellulose fibers than the thermosetting resins, thus producing a protective coating of thermosetting resins.

The incorporation of thermosetting resins into the cellulose structure modifies to some extent the effect of the polyhydric alcohol in such a way that the hardness and water resistance of the resulting cellulose fiber structures impregnated by the stabilizers are increased. The requirement of the properties determined by the ultimate use of the resulting article will guide the selection of the stabilizing material and its use either separately or jointly with a thermosetting resin.

Suitable thermosetting resins which may be employed in combination with the stabilizing material of the present invention include phenol formaldehyde, urea formaldehyde, and melamine formaldehyde, which are soluble in the volatile, hydrophilic solvents employed. Any other thermosetting resins which in their partially reacted state have the property of being soluble in such solvents may also be employed. The resins become insoluble and infusible upon advancement and prevent attack by water or solvents upon the stabilizing materials and reaction products thereof deposited in and on the cellulose fibers. The amount of thermosetting resin may be varied within a considerable range, for example, between 5% and 50% of thermosetting resin in the final cellulose fiber product based on the dry weight of fiber.

The advantages gained in impregnating articles made up of cellulose fibers with polyhydric alcohols alone and in combination with thermosetting resins are shown by the following examples which are to be taken in an illustrative rather than a limiting sense. In securing the data for such examples the procedure outlined below was followed.

A board prepared on a cylinder paper machine from used news fiber was cut into strips measuring 0.051" x 2" x 12", extending in its largest dimension perpendicular to the predominating direction of fibers in the board. The strips were immersed into the impregnating solution kept at 50° C. and they were allowed to remain therein until the board was wetter to its center.

The time required for complete impregnation was within a range of 1 to 8 minutes, and on the average was about 4 minutes.

The dry strip was weighed before impregnation and, after the immersion in the impregnant, dried by heating at 125° C. for 30 minutes. From the difference in weight, the quantity of dimensional stabilizing ingredients deposited within the board, in and on the fibers, was determined. The strips were accurately measured dry and then conditioned in a humidifying chamber, kept at 90% relative humidity and 38° C. for about 48 hours, at the end of which period the strips had absorbed a maximum of moisture and usually showed no further increase in expansion. The total expansion of each of the unimpregnated control strip and of the impregnated and dimensionally stabilized strip was thus determined. The difference in the amount of expansion between the control strip and the stabilized strip represents the amount of normal expansion removed by means of the dimensional stabilization treatment; the difference in expansion between the two strips divided by the total expansion of the control strip times 100 is the percent of normal expansion removed.

The flexural strength of the strip was determined by the known method of applying a load required to break the strip.

EXAMPLE 1

Cellulose fiber boards were immersed in and impregnated with ethylene glycol and its 50%, 25%, 12.5% solution in water. The corresponding content of ethylene glycol in the board was 60.5%, 42.5%, 25.4%, and 16.8% which, after drying and heating, showed a loss of 74.5%, 71.5%, 41.0% and 32%, respectively, in contraction and expansion due to varying humidity in the atmosphere as compared to those of an unimpregnated board treated in like manner.

Cellulose fiber boards were impregnated with solutions containing equal parts by weight of ethylene glycol and a thermosetting cresol-formaldehyde resin. The total quantity of ethylene glycol and cresol-formaldehyde resin in solution was varied from 50% to 3.2%. The solvent employed was water containing some isopropanol for preventing turbidity formation in the impregnating solutions during the adjustment of their pH to 3.5 by addition of the required quantity of 50% phosphoric acid. Impregnated boards containing 39.7%, 19.2%, 11.8% and 5.9% of active ingredients, after drying and heating, lost 78%, 58%, 51% and 40% of their original contraction and expansion, respectively.

Cellulose fiber boards impregnated with aqueous solutions containing ethylene glycol and a thermosetting urea-formaldehyde resin in equal quantities of varying concentrations containing 48%, 26.8%, 14.3%, 10.9% and 5.2% of impregnating ingredients, after drying and heating, and showed a loss of 55%, 41%, 28%, 27% and 14% in their property of contracting and expanding in varying humidity of the atmosphere. All impregnated samples, subsequent to their treatment showed also improvement in flexural strength and resistance to water absorption. Boards containing ethylene glycol alone possessed improved plasticity and those containing both the ethylene glycol and a thermosetting resin possessed improved rigidity.

EXAMPLE 2

Cellulose fiber boards were impregnated with diethylene glycol and its 50%, 25%, 12.5% and 3.125% aqueous solutions. The corresponding contents of diethylene glycol in boards after their drying and heating were 51.8%, 41.6%, 28.8%, 22.4%, 12.4% and 10.2% respectively, and the losses in contraction and expansion were 74.7%, 77.9%, 51.5%, 37.8%, 35.6% and 20%, respectively.

Cellulose fiber boards impregnated with solutions composed of equal quantities of diethylene glycol and thermosetting cresol-formaldehyde resin dissolved in various quantities of water containing a sufficient quantity of isopropanol for prevention of turbidity formation, after drying and heating, contained 43.3%, 24%, 13.5%, 9.2% and 3.9% of active ingredients and showed losses of 84.2%, 57%, 50.5%, 38.9% and 22%, respectively, in their property of contracting and expanding in varying humidity of the atmosphere.

The contents of total impregnating ingredients in cellulose fiber boards impregnated with aqueous solutions containing diethylene glycol and thermosetting urea-formaldehyde resin in equal concentrations were 38.3%, 21.5%, 10.4%, 5.9% and 5%. They lost 64.4%, 31%, 23.4%, 22.2% and 10% of their contraction and expansion, respectively. All impregnated boards showed improvements in water-resistance and flexural strength.

Boards containing diethylene glycol showed improvement in plasticity and those containing a thermosetting resin showed improved rigidity.

EXAMPLE 3

Cellulose fiber boards were impregnated with triethylene glycol and its solutions of various concentrations. After drying and heating, the boards showed improvement in dimensional stability, varying from 19% to 75%.

Cellulose fiber boards treated in like manner with solutions containing thermosetting cresol-formaldehyde resin and triethylene glycol lost, in part, their property of contracting and expanding, ranging from 19.5% to 74.4%.

An improvement in dimensional stabilization ranging from 14% to 55.4% was obtained on cellulose fiber boards impregnated with solutions of various concentrations containing equal quantities of triethylene glycol and thermosetting urea-formaldehyde resin.

EXAMPLE 4

Cellulose fiber boards were impregnated with propylene glycol and its solutions of various concentrations. The evaluation of boards after drying and heating indicated that the boards lost from 31 to 94% of their original contraction and expansion. Cellulose fiber boards impregnated with solutions containing propylene glycol and thermosetting cresol-formaldehyde resin in the first series of impregnation and propylene glycol and thermosetting urea-formaldehyde in the second series of impregnation showed, after drying and heating, a substantial improvement in dimensional stabilization, water-resistance, rigidity and flexural strength. A further improvement of properties was obtained when the boards were pressed during their heat treatment.

EXAMPLE 5

Cellulose fiber boards impregnated with dipropylene glycol and with its aqueous solutions of various concentrations contained, after drying and heating, from 8.2% to 46.4% of dipropylene. Their evaluation indicated that their dimensional stability was improved by 34% to 90%, respectively. Impregnated fiber boards containing, after drying and heating, 5.2% to 39.8% of dipropylene glycol and thermosetting cresol-formaldehyde resin in equal quantities, showed improvement in dimensional stability ranging between 26.6% to 71%, respectively, and those containing 3.9% to 43.2% of dipropylene glycol and thermosetting urea-formaldehyde resin showed improved dimensional properties ranging from 12% to 59.1%, respectively.

All impregnated and subsequently heat treated boards showed improved flexural strength and resistance to water.

EXAMPLE 6

Cellulose fiber boards impregnated with aqueous solutions of various concentrations of polyethylene glycol having an average molecular weight of 200, and known to the trade as "Polyethylene Glycol 200," contained after drying and heating, 10.5% to 48.2% of Polyethylene Glycol 200. Their evaluation showed that their dimensional stability was improved by 18.9% to 81.1%, respectively. Impregnated cellulose fiber boards containing, after drying and heating, 6.1% to 40% of Polyethylene Glycol 200, and thermosetting cresol-formaldehyde resin in equal proportions, lost 21.4% to 84.2% of their original contraction and expansion in varying humidity of the atmosphere.

Impregnated and heat treated boards containing polyethylene glycol and thermosetting urea-formaldehyde resin in equal proportions also showed a substantial improvement in dimensional stabilization.

Fiber boards were impregnated with isopropanol solutions containing 2%, 4%, 8% and 16% of stabilizing impregnant composed of equal quantities of Polyethylene Glycol 200 and a polymerized rosin known to the trade as PolyPale Resin. The impregnated and heat treated boards containing 5%, 8.3%, 13.1% and 23.6% of the stabilizing impregnant lost 25.6%, 28.9%, 33.3% and 40%, respectively, of their properties of contracting and expanding in varying humidity of the atmosphere.

Fiber boards were impregnated with acetone solutions containing 4%, 8%, 16% and 32% of a solute composed of equal quantities of "Polyethylene Glycol 200" and a hydrogenated rosin ester known to the trade as "Staybelite Ester #10". The impregnated and heat treated boards contained 6%, 6.3%, 14.3% and 23% of the above solute and showed 14.2%, 16.4%, 21.6% and 33% loss in their contraction and expansion properties.

All impregnated and heat treated boards showed improvements in water-resistance and flexural strength.

EXAMPLE 7

Cellulose fiber boards were impregnated with polyethylene glycols having average molecular weights of 300, 400 and 600 and known to the trade as Polyethylene Glycol 300, 400 and 600, respectively, and with their aqueous solutions of various concentrations. The impregnated and heat treated boards showed substantial improvements in dimensional stability when they were allowed to remain in varying humidity of the atmosphere.

Cellulose fiber boards were also impregnated with solutions of various concentrations containing in equal quantities one of the above polyethylene glycols and one of the following resins: cresol-formaldehyde, urea-formaldehyde, PolyPale Resin and Staybelite Ester #10. All impregnated and heat treated boards showed improvements in dimensional stability, water-resistance and flexural strength.

EXAMPLE 8

Cellulose fiber boards were impregnated with aqueous solutions of various concentrations containing polyethylene glycols having average molecular weights of 1000, 1500, 1540, 4000 and 6000 and known to the trade as Carbowax 1000, 1500, 1540, 4000 and 6000, respectively. Boards were also impregnated with solutions of various concentrations containing in equal quantities one of the above Carbowaxes and a thermosetting resin.

All of the impregnated and subsequently heat treated boards showed improved dimensional stability in varying humidity of the atmosphere, water-resistance and flexural strength.

EXAMPLE 9

A cellulose fiber board strip was impregnated with 1,5-pentanediol which was subsequently heated for 30 minutes at 125° C. It was found that the board contained 48.2% of 1,5-pentanediol and that its dimensional stability in varying humidity of the atmosphere was improved by 80%.

It was found that when cellulose fiber boards were impregnated with aqueous solutions containing 3.12%, 6.25%, 12.5%, 25% and 50% of 1,5-pentanediol as stabilizing impregnant, the impregnated boards contained, after drying and heating, 5.3%, 7.9%, 13.2%, 25.2% and 43.1% of the stabilizer, respectively, and that they lost 19.1%, 39.2%, 60.8% and 92%, respectively, of their contraction and expansion in varying humidity of the atmosphere.

Impregnated and heat treated boards containing 6.2%, 9.7%, 15.1%, 24.8% and 45.2% of dimensional stabilizing ingredients composed of equal quantities of 1,5-pentanediol and thermosetting urea-formaldehyde resin lost 24.6%, 42%, 45.2%, 56.9% and 73.1% of their contraction and expansion in varying humidity of the atmosphere.

Cellulose fiber boards impregnated with solutions containing various concentrations of a solute composed of equal quantities of 1,5-pentanediol and thermosetting cresol-formaldehyde resin contained, after drying and heating, 6.3%, 8%, 17.2%, 29.8% and 42% of the above solute with a corresponding loss of 26.8%, 45.1%, 53.6%, 74.4% and 92%, respectively, of contraction and expansion in varying humidity of the atmosphere.

EXAMPLE 10

Cellulose fiber boards were impregnated with glycerol and its aqueous solutions containing 50%, 25%, 12.5%, 6.25% and 3.125% glycerol as a dimensional stabilizer. The impregnated boards contained, after drying and heating, 68%, 52%, 33%, 17%, 11% and 6% of glycerol, respectively, and showed a loss in contraction and expansion in quantities amounting to 90%, 78%, 53%, 23%, 11% and 9%, respectively.

Cellulose fiber boards impregnated with a solution of various concentrations containing equal quantities of glycerol and thermosetting cresol-formaldehyde resin as stabilizer contained, after drying and heating, 44%, 25%, 13%, 6.7% and 5.1% of the above solute; their dimensional stabilization was improved by 69%, 57%, 33%, 31% and 11%, respectively.

EXAMPLE 11

Cellulose fiber boards were impregnated with mannitol, by immersion in aqueous solutions of various concentrations and with solutions of various concentrations containing equal quantities of mannitol and thermosetting melamine-formaldehyde resin showed, after drying and heating, improved dimensional stability, water-resistance and flexural strength.

EXAMPLE 12

Cellulose fiber boards impregnated with solutions of various concentrations containing sorbitol and solutions of various concentrations containing sorbitol and cresol-formaldehyde, showed, after drying and heating, improved dimensional stability, water-resistance and flexural strength.

EXAMPLE 13

Cellulose fiber boards impregnated with 25%, 12.5%, 6.25% and 3.125% of pentaerythritol aqueous solutions contained, after drying and heating, 39%, 18%, 12%, and 4.9% of pentaerythritol, respectively, and showed, under varying humidity of the atmosphere, reductions in contraction and expansion by 88%, 66%, 37% and 21%, respectively.

Cellulose fiber boards impregnated with solutions of various concentrations containing equal quantities of pentaerythritol and melamine-formaldehyde thermosetting resin showed, after drying and heating, improved dimensional stability, rigidity, water-resistance and flexural strength.

EXAMPLE 14

Aqueous solutions containing 3.125%, 6.25%, 12.5% and 25% of resorcinol were prepared and employed in impregnation of fiber board by immersion of the board therein. Impregnated boards containing 4%, 11%, 17% and 33% of resorcinol lost, after drying and heating, 27%, 50%, 63% and 89%, respectively, of their original property of contracting and expanding in varying humidity of the atmosphere. Cellulose fiber boards impregnated with solutions of various concentrations containing equal quantities of resorcinol and cresol-formaldehyde resin as dimensional stabilizer dissolved in isopropanol contained 8.6%, 9.3%, 16% and 29% of total stabilizer and showed a loss of 27%, 36%, 42% and 45%, respectively, in their property of expanding and contracting in varying humidity of the atmosphere.

Cellulose fiber boards were impregnated with solutions of various concentrations composed of equal quantities of resorcinol and urea-formaldehyde resin dissolved in solvent composed of equal quantities of isopropanol and water. The boards, after drying and heating, contained 5%, 8.6%, 16% and 29% of total stabilizer and lost 9.2%, 20%, 33% and 41% of their original ability of contracting and expanding in varying humidity of the atmosphere.

All impregnated and heat treated boards showed improved water-resistance, rigidity, flexural strength and resistance to attack by insects and micro-organisms.

EXAMPLE 15

Cellulose fiber boards, impregnated with solutions obtained by dissolving in water various quantities of hydroquinone, contained 7%, 9.7%, 11% and 22% of the hydroquinone stabilizer and lost 35%, 40%, 57% and 99%, respectively, in their original property of contracting and expanding in varying humidity of the atmosphere. Hydroquinone impregnating solutions containing either cresol- or urea-formaldehyde resin were also effective in producing a substantial stabilization in cellulose fiber boards.

EXAMPLE 16

Cellulose fiber boards impregnated with solutions containing catechol alone or in combination with hydrophilic thermosetting resins acquired, after heating, improved dimensional stability, water-resistance and resistance to decay.

Where impregnation of the fibers is attempted prior to the preparation of a fiber board, economic and operational restrictions will narrow the selection of the polyhydric alcohols employed under such circumstances to those which are soluble in water. Comminuted cellulose fibers can be impregnated, however, with the stabilizing chemicals dissolved in organic solvents and structural members made therefrom show excellent dimensional stability under extremes of humidity conditions. This is shown in the following example:

EXAMPLE A

An aqueous pulp suspension of a consistency of 1% was prepared containing 3% concentration of catechol based on solution. Sheets of fiber board were prepared from this pulp, cut to size and the expansion determined by increasing the humidity from 0% to 90%. When this expansion was compared with that of board made from another portion of the same pulp without the presence of the stabilizer, it was found that a 9.7% content of the polyhydric alcohol in the board, based on the weight of dry fiber, eliminated 42% of the normal expansion.

The same type of results were obtained when applying a solution of the stabilizing chemicals to the wet end of the paper making machine. This operation gives somewhat greater flexibility in the choice of stabilizing compound to be employed, as compared with addition to the beater or head chest, for example, since it is entirely practicable to use organic solvent solutions of the stabilizer, for instance, a solution made of 25% water and 75% isopropyl alcohol and containing 2% concentration of Carbowax 1500 and 5% cresol-formaldehyde thermosetting resin. When applying such a solution to the wet lap in amounts to provide 10.2% of impregnant in the board on a dry fiber basis, reductions in the normal expansion of 35.2% were obtained. At these lower dilutions, good results were obtained but, in many instances, operating technique will dictate the employment of relatively concentrated solutions when application is made to the wet lap.

Laminated cellulose structural fiber board may be impregnated with the dimensional stabilizer in any suitable fashion although immersion in the dimensional stabilizer or a solution thereof is recommended. In general, the temperature of the liquid in which the laminated cellulose structural fiber board is immersed will be at room temperature. Where a laminated product of an exceptionally high caliper is to be impregnated, the temperature of the liquid may be elevated to facilitate penetration. The laminated board may be soaked in the impregnating solution until such time as the desired quantity of dimensional stabilizer has been absorbed by or combined in some physico-chemical manner with the cellulose.

It may be found expedient when treating laminated cellulose structural fiber boards, or other cellulose elements which are relatively rigid, to pack the same in a chamber, preferably in an upright position, having the boards spaced slightly apart to facilitate free circulation. It will also be found expedient to subject the chamber to vacuum whereby gases and other volatile materials, which interfere with free penetration of the solution into the board, are removed. Liquid containing the dimensional stabilizer is then admitted to the evacuated chamber containing the cellulose material and penetration throughout the body of the cellulose elements is facilitated. The impregnated boards are then removed from the solution and passed through any conventional form of drier.

The term "polyhydric alcohol" is employed herein with the generally accepted meaning, i. e., an alcohol having more than one hydroxyl group in its molecules. The term is therefore not intended to include all compounds having more than one hydroxyl group in its molecules. Thus, the carbohydrates, for example the sugars, are not considered to be polyhydric alcohols although their molecules, in general, contain several hydroxyl groups. The carbohydrates additionally contain aldehyde groups, keto groups or lactone, furanose or pyranose rings, i. e., oxygen containing rings, in their molecules. Such compounds are classed as polyhydric aldehydes (aldoses), polyhydric ketones (ketoses) or lactones, or sugars having furanose or pyranose structure, respectively, and have physical and chemical properties differing materially from the polyhydric alcohols employed in the present invention.

Examples of the polyhydric alcohols which may be employed in the present invention are simple glycols such as ethylene glycol and propylene glycol, as well as polyalkylene glycols such as diethylene glycol, triethylene glycol and dipropylene glycol and polyalkylene glycols up to a molecular weight of 6000. Such polyalkylene glycols are commercial products and are sold as mixtures of various polyalkylene glycols on the basis of molecular weight, for example, 200, 300, 600, 1000, 1500, 4000 and 6000. The polyalkylene glycols of higher molecular weight are semi-solids but are soluble in water in substantially all proportions. Other polyhydric alcohols are also effective stabilizers, for example, glycerol, mannitol, sorbitol, as well as 1,5-pentanediol, pentaerythritol, resorcinol, hydroquinone, butanediol-1,3; 2-ethylhexanediol-1,3; propanediol-1,3; pentanediol-1,4; hexanediol-1,6; 2,2,4-trimethylpentanediol-1,3; decanediol-1,10; pentanetriol-1,2,3; hexanetriol-1,2,5; butanetetrol-1,2,3,4; octadiene-2,6-diol-4,5; heptaneheptole-1,2,3,4,5,6,7; phloroglucinol; pyrogallol and the like.

Polyhydric alcohols as defined above, in general, have the requisite physical characteristics for employment in the present invention. One of the important physical requirements of the polyhydric alcohol employed is that it be soluble in water or volatile, water-miscible solvents, i. e., volatile hydrophilic solvents as defined below. In general, the greater its solubility in one of such solvents the greater the penetration of the polyhydric alcohol into the cellulose fibers and the greater its stabilizing effect. The latter is true irrespective of whether the polyhydric alcohol is employed in a solvent solution during impregnation.

Another important physical characteristic of the polyhydric alcohol is that it be substantially non-volatile under all temperature conditions likely to be encountered. That is to say, it should have a boiling point at least as high as 150° C. and preferably higher at atmospheric pressure.

As to the solvents which may be employed for making up an impregnating solution, water is the preferred solvent and will ordinarily be employed alone if the polyhydric alcohol is soluble therein as is usually the case. If necessary to obtain solution of the polyhydric alcohol, water-miscible organic solvents such as mono aliphatic alcohols containing three carbons or less, or mono aliphatic ketones containing five carbons or less may be employed either alone or in admixture with each other or water. By way of example, methyl, ethyl and propyl alcohols are particularly suitable and dimethyl, diethyl, methyl ethyl, methyl propyl or ethyl propyl ketones are also suitable. Such solvents or solvent mixtures should have a boiling point substantially below that of the stabilizing material, i. e., a boiling point not above approximately 105° C. at atmospheric pressure. Such solvents may be termed volatile hydrophilic solvents and for purposes of this application, the term "volatile hydrophilic solvent" is defined as water, a water-miscible organic solvent or mixture thereof having a boiling point not greater than 105° C.

To summarize, the stabilizing materials in accordance with the present invention are either aromatic or aliphatic polyhydric alcohols or mixtures thereof. In addition to such chemical requirements they should be soluble in all proportions in at least one volatile hydrophilic solvent as defined above and should have a boiling point at least as high as 150° C. Since solubility in volatile hydrophilic solvents depends upon several factors such as the number of hydrophilic groups, for example, hydroxyl groups, the saturation of the compound, and arrangement of carbons as well as the number of carbons, it is impossible to more definitely specify the nature of the effective compounds by chemical characteristics. A similar situation exists as to the boiling points of the effective compounds.

The concentration of the impregnating solution can vary from 100% polyhydric alcohol in the case of low viscosity polyhydric alcohols such as ethylene glycol, propylene glycol, glycerol, etc., down to a concentration as low as 1% in the case of polyhydric alcohols of high molecular weight, for example, semi-solid polyalkylene glycols. In general, however, the best results are obtained when the polyhydric alcohol is employed in a solution having a concentration ranging between approximately 5 and 60%. Also in general, the dimensional stability obtained does not decrease proportionately with the decrease in concentration of the impregnating solution. When very dilute solutions are employed, a disproportionately high degree of stabilization is retained. Thus, the concentration of the polyhydric alcohol in the impregnating solution may range from approximately 1 to 100% and the amount of polyhydric alcohol retained in the fibrous material may range from approximately 1 to 50%, the preferred range being between approximately 3 and 50%.

The temperature of the impregnating solution during impregnation of the structures has an effect upon the results obtained. That is to say, the rate of penetration of the polyhydric alcohol or solutions thereof into the fiber board, the quantity of deposition of the polyhydric alcohol in the board and the resulting improvement in dimensional stability in such impregnated fiber structures not only depend upon the concentration of the solution, but also depend on the temperature of the impregnating solution. The higher the temperature at which impregnation is carried on, the greater the amount of polyhydric alcohol retained in the board for a given concentration of the impregnating solution and the more effective is the dimensional stabilization. The usual impregnating temperatures will range between 20° C. and 60° C., although any temperature below that at which rapid vaporization of the impregnating solution takes place may be employed. Such temperature will not ordinarily be above 100° C.

The affinity of the polyhydric alcohols for cellulose fibers, their powers of penetration and the reason for their fixation on and in the cellulose fibers is not fully understood. From a consideration of their molecular structure, it may be supposed that their affinity for cellulose fibers depends upon the presence of hydroxyl groups in both the cellulose and in the alcohol. Their power of penetration is possibly due to the presence of balanced hydrophilic and hydrophobic groups in the molecules which is characteristic of surface active materials. These two properties apparently facilitate the deposition of the polyhydric alcohols in and on the cellulose fibers.

The polyhydric alcohols deposited in the fibrous products exhibit considerable resistance to removal by water and solvents, particularly if the impregnated fibrous products are heated during drying or thereafter to temperatures between approximately 100° and 200° C. This indicates the possibility of a reaction between the cellulose and the polyhydric alcohols, or at least from physico-chemical action, to modify the cellulose. The modification of the cellulose is beneficially reflected by the increased dimensional stability and the increased strength and decreased water absorptivity of the resulting product.

The fixation of polyhydric alcohols in and on the cellulose fibers of the structure can be enhanced by employing them in combination with thermosetting resins which in their partially reacted state are soluble in water, lower molecular weight alcohols or ketones or mixtures thereof. The thermosetting resins, after setting, are believed to cover and protect the polyhydric alcohols and their reaction products in and on the cellulose fibers from attack by solvent. In this connection it is further believed that the polyhydric alcohols penetrate further into the cellulose fibers than the thermosetting resins, thus producing a protective coating of the thermosetting resin on the impregnated fibers.

The incorporation of thermosetting resins into the polyhydric alcohol solutions modifies to some extent the properties of the resulting product such that the hardness and water-resistance of the resulting fibrous structures are increased. The requirements of the properties determined by the ultimate use of the resulting article will guide the selection of the polyhydric alcohol and its use, either separately or jointly with the thermosetting resin.

Suitable thermosetting resins which may be employed in combination with the polyhydric alcohols of the present invention include phenol-formaldehyde, urea-formaldehyde and melamine-formaldehyde resins which, in their partially reacted state, are soluble in the volatile hydrophilic solvents above discussed. Any other thermosetting resins which in their partially reacted state have the property of being soluble in such solvents may also be employed. The resins become insoluble and infusible after curing and prevent attack by water or other solvents upon the polyhydric alcohol and any reaction products thereof deposited in and on the cellulose fibers. The amount of thermosetting resin employed may be varied within a considerable range, for example between 5 and 50% of the mixture of polyhydric alcohol and thermosetting resin in the impregnating solution and in the final cellulose fiber product.

What is claimed is:

1. The method of stabilizing fiber boards consisting essentially of felted cellulose pulp fibers against expansion and contraction with changes in atmospheric humidity, which process comprises, impregnating said boards substantially throughout said boards with a solution in a volatile hydrophilic solvent of a mixture of a thermosetting resin and at least one polyhydric alcohol to cause said alcohol to penetrate between the fibers and into the fiber cells, and drying and heating the resulting impregnated boards to cure said resin, said polyhydric alcohol and thermosetting resin being soluble in said volatile hydrophilic solvent, said polyhydric alcohol having a boiling point at least as high as 150° C., said solution having a concentration of said mixture between approximately 5 and 60% and said thermosetting resin constituting between approximately 5 and 50% of said mixture.

2. The method of stabilizing fiber boards consisting essentially of felted cellulose pulp fibers against expansion and contraction with changes in atmospheric humidity, which process comprises, impregnating said boards substantially throughout said boards with a solution in a volatile hydrophilic solvent of a mixture of a thermosetting resin and propylene glycol to cause said glycol to penetrate between the fibers and into the fiber cells, and drying and heating the resulting impregnated boards to cure said resin, said thermosetting resin being soluble in said volatile hydrophilic solvent, said solution having a concentration of said mixture between approximately 5 and 60% and said thermosetting resin constituting between approximately 5 and 50% of said mixture.

3. The method of stabilizing fiber boards consisting essentially of felted cellulose pulp fibers against expansion and contraction with changes in atmospheric humidity, which process comprises, impregnating said boards substantially throughout said boards with a solution in a volatile hydrophilic solvent of a mixture of a thermosetting resin and 1,5-pentanediol to cause said 1,5-pentanediol to penetrate between the fibers and into the fiber cells, and drying and heating the resulting impregnated boards to cure said resin, said thermosetting resin being soluble in said volatile hydrophilic solvent, said solution having a concentration of said mixture between approximately 5 and 60% and said thermosetting resin constituting between approximately 5 and 50% of said mixture.

4. The method of stabilizing fiber boards consisting essentially of felted cellulose pulp fibers against expansion and contraction with changes in atmospheric humidity, which process comprises, impregnating said boards substantially throughout said boards with a solution in a volatile hydrophilic solvent of a mixture of a thermosetting resin and glycerol to cause said glycol to penetrate between the fibers and into the fiber cells, and drying and heating the resulting impregnated boards to cure said resin, said thermosetting resin being soluble in said volatile hydrophilic solvent, said solution having a concentration of said mixture between approximately 5 and 60% and said thermosetting resin constituting between approximately 5 and 50% of said mixture.

5. As a product of manufacture, a fiber board consisting essentially of felted cellulose pulp fibers and containing as an impregnant distributed substantially throughout said board between approximately 1% and 50%, based on the weight of said board, of a mixture of a heat cured thermosetting resin and at least one polyhydric alcohol, said thermosetting resin in partially reacted form and said polyhydric alcohol being soluble in a volatile hydrophilic solvent and said polyhydric alcohol having a boiling point at least as high as 150° C., the amount of said thermosetting resin being between approximately 5 and 50% of said mixture.

6. As a product of manufacture, a fiber board consisting essentially of felted cellulose pulp fibers and containing as an impregnant distributed substantially throughout said board between approximately 1% and 50%, based on the weight of said board, of a mixture of a heat cured thermosetting resin and propylene glycol, said thermosetting resin in partially reacted form being soluble in a volatile hydrophilic solvent, the amount of said heat cured thermosetting resin being between approximately 5 and 50% of said mixture.

7. As a product of manufacture, a fiber board consisting essentially of felted cellulose pulp fibers and containing as an impregnant distributed substantially throughout said board between approximately 1% and 50%, based on the weight of said board, of a mixture of a heat cured thermosetting resin and 1,5-pentanediol, said thermosetting resin in partially reacted form being soluble in a volatile hydrophilic solvent, the amount of said heat cured thermosetting resin being between approximately 5 and 50% of said mixture.

8. As a product of manufacture, a fiber board consisting essentially of felted cellulose pulp fibers and containing as an impregnant distributed substantially throughout said board between approximately 1% and 50%, based on the weight of said board, of a mixture of a heat cured thermosetting resin and glycerol, said thermosetting resin in partially reacted form being soluble in a volatile hydrophilic solvent, the amount of said heat cured thermosetting resin being between approximately 5 and 50% of said mixture.

*9. The method of stabilizing a sheet of cellulose material consisting predominantly of felted cellulose pulp fibers against expansion and contraction with changes in atmospheric humidity, which process comprises, impregnating said cellulose material substantially throughout with a solution in a volatile hydrophilic solvent of a mixture of a thermosetting resin and at least one polyhydric alcohol to cause said alcohol to penetrate between the fibers and into the fiber cells, and drying and heating the resulting impregnated cellulose material to cure said resin, said polyhydric alcohol and thermosetting resin being soluble in said volatile hydrophilic solvent, said polyhydric alcohol having a boiling point at least as high as 150° C., said solution having a concentration of said mixture between approximately 5 and 60% and said thermosetting resin constituting between approximately 5 and 50% of said mixture.*

*10. The method of stabilizing a sheet of cellulose material consisting predominantly of felted cellulose pulp fibers against expansion and contraction with changes in atmospheric humidity, which process comprises, impregnating said cellulose material substantially throughout with a solution in a volatile hydrophilic solvent of a mixture of a thermosetting resin and propylene glycol to cause said glycol to penetrate between the fibers and into the fiber cells, and drying and heating the resulting impregnated cellulose material to cure said resin, said thermosetting resin being soluble in said volatile hydrophilic solvent, said solution having a concentration of said mixture between approximately 5 and 60% and said thermosetting resin constituting between approximately 5 and 50% of said mixture.*

*11. The method of stabilizing a sheet of cellulose material consisting predominantly of felted cellulose pulp fibers against expansion and contraction with changes in atmospheric humidity, which process comprises, impregnating said cellulose material substantially throughout with a solution in a volatile hydrophilic solvent of a mixture of a thermosetting resin and 1,5-pentanediol to cause said 1,5-pentanediol to penetrate between the fibers and into the fiber cells, and drying and heating the resulting impregnated cellulose material to cure said resin, said thermosetting resin being soluble in said volatile hydro-*

*philic solvent, said solution having a concentration of said mixture between approximately 5 and 60% and said thermosetting resin constituting between approximately 5 and 50% of said mixture.*

*12. The method of stabilizing a sheet of cellulose material consisting predominantly of felted cellulose pulp fibers against expansion and contraction with changes in atmospheric humidity, which process comprises, impregnating said cellulose material substantially throughout with a solution in a volatile hydrophilic solvent of a mixture of a thermosetting resin and glycerol to cause said glycerol to penetrate between the fibers and into the fiber cells, and drying and heating the resulting impregnated cellulose material to cure said resin, said thermosetting resin being soluble in said volatile hydrophilic solvent, said solution having a concentration of said mixture between approximately 5 and 60% and said thermosetting resin constituting between approximately 5 and 50% of said mixture.*

*13. As a product of manufacture, a sheet of cellulose material consisting predominantly of felted cellulose pulp fibers and containing as an impregnant distributed substantially throughout said cellulose material between approximately 1% and 50%, based on the weight of said cellulose material, of a mixture of a heat cured thermosetting resin and at least one polyhydric alcohol, said thermosetting resin in partially reacted form and said polyhydric alcohol being soluble in a volatile hydrophilic solvent and said polyhydric alcohol having a boiling point at least as high as 150° C., the amount of said thermosetting resin being between approximately 5 and 50% of said mixture.*

*14. As a product of manufacture, a sheet of cellulose material consisting predominantly of felted cellulose pulp fibers and containing as an impregnant distributed substantially throughout said cellulose material between approximately 1% and 50%, based on the weight of said cellulose material, of a mixture of a heat cured thermosetting resin and propylene glycol, said thermosetting resin in partially reacted form being soluble in a volatile hydrophilic solvent, the amount of said heat cured thermosetting resin being between approximately 5 and 50% of said mixture.*

*15. As a product of manufacture, a sheet of cellulose material consisting predominantly of felted cellulose pulp fibers and containing as an impregnant distributed substantially throughout said cellulose material between approximately 1% and 50%, based on the weight of said cellulose material, of a mixture of a heat cured thermosetting resin and 1,5-pentanediol, said thermosetting resin in partially reacted form being soluble in a volatile hydrophilic solvent, the amount of said heat cured thermosetting resin being between approximately 5 and 50% of said mixture.*

*16. As a product of manufacture, a sheet of cellulose material consisting predominantly of felted cellulose pulp fibers and containing as an impregnant distributed substantially throughout said cellulose material between approximately 1% and 50%, based on the weight of said cellulose material, of a mixture of a heat cured thermosetting resin and glycerol, said thermosetting resin in partially reacted form being soluble in a volatile hydrophilic solvent, the amount of said heat cured thermosetting resin being between approximately 5 and 50% of said mixture.*

References Cited in the file of this patent or the original patent

UNITED STATES PATENTS

| | | |
|---|---|---|
| 949,671 | Baekland | Feb. 15, 1910 |
| 2,045,350 | Griffin | June 23, 1936 |
| 2,452,200 | Kvalnes et al. | Oct. 26, 1948 |
| 2,568,849 | Frasold et al. | Sept. 25, 1951 |